2,816,095

TERPOLYMER OF METHYLSTYRENES

Donald L. Swanson, Stamford, Conn., assignor to American Cyanamid Company, New York, N. Y., a corporation of Maine No Drawing. Application October 12, 1953,
Serial No. 385,703

3 Claims. (Cl. 260—80.5)

This invention relates to polymers of methylstyrene. More particularly, this invention relates to polymers containing the three isomers of methylstyrene, their method of production and products produced therefrom.

Polystyrene is perhaps one of the oldest known synthetic resins which finds many uses in molding and in casting transparent articles of various shapes and sizes. Other uses of polystyrene are also readily apparent to one skilled in the art. However, due to the low heat distortion temperature of polystyrene, articles prepared therefrom do not find acceptance when boiling water must be tolerated.

It is an object of my invention to prepare polymers of the isomers of methylstyrene. It is a further object of my invention to prepare polymers of methylstyrene possessing high heat distortion points. These and other objects of my invention will be discussed more fully hereinbelow.

I have found that when the three possible isomers of methylstyrene are polymerized in a particular ratio that a polymer of high heat distortion is obtained. I have found that when methylstyrene isomers in the weight ratio of from 25 to 40% ortho, less than about 5% meta and from about 60 to 75% para are polmerized, a polymer possessing increased heat distortion is obtained. When the meta isomer is further reduced in the polymer, preferably less than about 2% by weight, a polymer of desired properties is obtained. The ortho isomer is preferably present in the polymer in the ratio of from about 28 to 35% by weight and the para isomer is preferably present in the order of from about 65 to 72% by weight.

In order that those skilled in the art may understand more fully the inventive concept herein set forth, the following example is given by way of illustration and not limitation unless otherwise noted in the appended claims.

*Example 1*

The three isomers of methylstyrene in the ratio of 30% by weight of ortho, 3% meta and 67% para were introduced into a tube which was subsequently purged with nitrogen gas, sealed and placed in an oil bath wherein bulk polymerization of the monomers was carried out. The catalyst utilized was benzoyl peroxide in the amount of 0.1% by weight. The monomers were polymerized for 5 days at 100° C. and for 2 days at 130° C. The polymers obtained consisted of 99.4% polymeric material.

The polymethylstyrene obtained was then compared with a conventional polystyrene. Objects formed by compression molding of the polymethylstyrene exhibited heat distortion temperature of 97° C. as compared with 87° C. for like forms of compression molded polystyrene. Tabulated below are data comparing injection molding of the same two materials.

|  | Polymethylstyrene | Polystyrene |
|---|---|---|
| Molecular Weight | 88,000 | 90,000 |
| Heat Distortion Temperature, ° C. | 93 | 83 |
| Peakes Flow ° C | 144 | 127 |

Conventional polymerization catalysts may be employed in the polymerization of the isomers of methylstyrene. Preferably, organic peroxides and hydroperoxides are utilized. Examples of these catalysts are such as benzoyl peroxide, succinyl peroxide, acetyl peroxide, toluyl peroxide, t-butyl hydroperoxide, and the like. The amount of the catalyst present may vary over rather wide limits depending upon the desired rate of polymerization. In some instances, it may even be desired to omit the catalyst during the polymerization. A catalyst in an amount of from about 0.01% to about 5% by weight is usually satisfactory.

The polymerization of the isomers of methylstyrene may be carried out at temperatures ranging from about 80° C. to about 135° C. and at atmospheric pressure. While the example set forth hereinabove discloses bulk polymerization, other processes may be employed if desired. Thus, the polymerization may be carried out in an emulsion. Other methods of polymerization will also be apparent.

Dyes, pigments and/or other additives may also be added to the polymers to obtain colored or modified products.

It is also possible to copolymerize acrylonitrile with the isomeric monomers of methylstyrene. The polymers thus prepared possess increased flexural strength, chemical resistance, etc. When acrylonitrile is present during the polymerization, it is preferably present in an amount varying between about 5 to about 40% by weight based on the total weight. Other polymerizable ethylenically unsaturated compounds may also be copolymerized with the monomeric isomers of methylstyrene in accordance with the teachings of my invention.

The polymethylstyrene prepared according to my invention is soluble in benzene. It finds employment in applications wherein polystyrene has been previously employed. Not only is the polymer transparent but it also possesses the high heat distortion point unattainable from polystyrene. Uses of the polymethylstyrene of my invention are such as in resin impregnated paper, high impact strength synthetic rubber, unsaturated polyester resin surface coatings, and the like.

I claim:

1. A process for producing a composition of matter which comprises polymerizing in an inert atmosphere and under heat from about 25–40% orthomethylstyrene, less than about 5% metamethylstyrene and from about 60–75% paramethylstyrene wherein all percentages are percent by weight.

2. A compositon of matter which comprises a copolymer of from about 25–40% orthomethylstyrene, less than about 5% metamethylstyrene and from about 60–75% paramethylstyrene wherein all percentages are percent by weight.

3. A composition of matter which comprises a copolymer of about 28–35% orthomethylstyrene, less than about 2% metamethylstyrene and about 72–65% paramethylstyrene wherein all percentages are percent by weight.

References Cited in the file of this patent

Dixon et al.: Ind. Eng. Chem., 46, 652–660, April 1954.
Boundy-Boyer: "Styrene," etc., 1232–1241 (Reinhold, 1952).